United States Patent
Kamizono et al.

(10) Patent No.: US 11,198,772 B2
(45) Date of Patent: Dec. 14, 2021

(54) SURFACE TREATMENT LIQUID AND SURFACE TREATMENT METHOD

(71) Applicant: Tokyo Ohka Kogyo Co., Ltd., Kanagawa (JP)

(72) Inventors: Takashi Kamizono, Kanagawa (JP); Takahiro Senzaki, Kanagawa (JP); Takuya Noguchi, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 150 days.

(21) Appl. No.: 16/172,956

(22) Filed: Oct. 29, 2018

(65) Prior Publication Data
US 2019/0127541 A1 May 2, 2019

(30) Foreign Application Priority Data
Oct. 31, 2017 (JP) ............................. JP2017-211379

(51) Int. Cl.
| | | |
|---|---|---|
| C09D 133/24 | (2006.01) |
| C09D 133/06 | (2006.01) |
| C08J 7/054 | (2020.01) |
| C09D 133/26 | (2006.01) |
| C09D 5/00 | (2006.01) |
| C08J 7/04 | (2020.01) |
| C08J 7/056 | (2020.01) |
| C09D 7/20 | (2018.01) |
| C09D 7/65 | (2018.01) |
| C08L 33/26 | (2006.01) |
| C08L 33/24 | (2006.01) |

(52) U.S. Cl.
CPC ............. *C08J 7/054* (2020.01); *C08J 7/0427* (2020.01); *C08J 7/056* (2020.01); *C09D 5/00* (2013.01); *C09D 7/20* (2018.01); *C09D 133/06* (2013.01); *C09D 133/24* (2013.01); *C09D 133/26* (2013.01); *C08J 2383/04* (2013.01); *C08L 33/24* (2013.01); *C08L 33/26* (2013.01); *C09D 7/65* (2018.01)

(58) Field of Classification Search
CPC .. C09D 133/24; C09D 133/06; C09D 133/18; C08L 33/26; C08L 33/06; C08L 33/18; C08F 220/60; C08F 220/54
See application file for complete search history.

(56) References Cited

U.S. PATENT DOCUMENTS

| | | | | |
|---|---|---|---|---|
| 4,311,805 A * | 1/1982 | Moritani | ................ | C08F 220/60 162/168.2 |
| 4,788,267 A * | 11/1988 | Chiao | .................... | C08F 220/28 526/287 |
| 5,093,413 A * | 3/1992 | Bhattacharyya | ...... | C08F 220/56 524/535 |
| 6,197,919 B1 * | 3/2001 | Crisp | .................... | C08F 220/58 528/230 |
| 6,627,719 B2 * | 9/2003 | Whipple | ............... | C08F 220/60 526/319 |
| 6,691,715 B2 * | 2/2004 | Matz | ..................... | C04B 24/163 132/202 |
| 7,015,279 B2 * | 3/2006 | Braun | ..................... | A61K 8/72 524/815 |
| 7,064,232 B2 * | 6/2006 | Liu | ....................... | C08F 226/10 560/222 |
| 7,125,469 B2 * | 10/2006 | Barcus | ................... | C08F 271/00 162/123 |
| 8,114,936 B2 * | 2/2012 | Pawlowska | ........... | D21H 17/37 524/547 |
| 2004/0058600 A1 * | 3/2004 | Bunyard | ............. | D06M 15/263 442/59 |
| 2011/0118362 A1 * | 5/2011 | Dull | ...................... | C08F 220/60 514/772.4 |
| 2013/0085230 A1 * | 4/2013 | Hood | .................... | C08F 277/00 525/117 |
| 2017/0088683 A1 * | 3/2017 | Senzaki | .............. | C09D 125/18 |
| 2017/0266694 A1 * | 9/2017 | Senzaki | .............. | C09D 133/26 |
| 2019/0375871 A1 * | 12/2019 | Benson | ............. | C08F 222/1006 |

FOREIGN PATENT DOCUMENTS

| | | | | |
|---|---|---|---|---|
| EP | 3 023 557 A1 * | 1/2016 | ............. | C08F 2/38 |
| EP | 3 147 334 | 3/2017 | | |
| EP | 3 219 400 | 9/2017 | | |
| JP | 2009-126948 | 6/2009 | | |
| JP | 2017-61682 | 3/2017 | | |
| JP | 2017-165915 | 9/2017 | | |
| WO | WO 2016/207187 A1 * | 12/2016 | ............. | B01J 13/10 |

OTHER PUBLICATIONS

Extended European Search Report dated Mar. 11, 2019 in European Patent Application No. 18203093.2.

* cited by examiner

Primary Examiner — Rip A Lee
(74) *Attorney, Agent, or Firm* — Wenderoth, Lind & Ponack, L.L.P.

(57) ABSTRACT

To provide a surface treatment liquid capable of making a base material including polyorganosiloxane on at least a part of a surface thereof hydrophilic stably over a long period of time, and provide a surface treatment method using the surface treatment liquid. In a surface treatment liquid including (A) resin and a (B) solvent, as the (A) resin, resin having a functional group I that is a hydroxyl group and/or a cyano group is used, and a functional group II that is a hydrophilic group other than the functional group I, and a ratio of a structural unit having an anionic group to total structural units of the (A) resin is 5 mol % or less, or resin including a cationic group including an anion moiety and a cation moiety that can be bonded to the (A) resin is used.

7 Claims, No Drawings

SURFACE TREATMENT LIQUID AND SURFACE TREATMENT METHOD

This application is based on and claims the benefit of priority from Japanese Patent Application No. 2017-211379, filed on 31 Oct. 2017, the content of which is incorporated herein by reference.

BACKGROUND OF THE INVENTION

Field of the Invention

The present invention relates to a surface treatment liquid, and a surface treatment method using the surface treatment liquid.

Related Art

Conventionally, in order to modify properties of surfaces of various types of articles, various surface treatment liquids have been used. In surface modification, there is a great demand for making surfaces of articles hydrophilic, and accordingly many agents and surface treatment liquids for making surfaces of articles hydrophilic have been proposed.

For such agents for making hydrophilic, for example, an agent for hydrophilic treatment including a block copolymer of a polyvinyl alcohol resin block having a mercapto group and a polyanion resin block obtained by polymerizing a polymerizable monomer having at least one carboxy group and/or sulfonic acid group in a molecule, and polyacrylic acid, has been proposed (Patent Document 1).

Patent Document 1: Japanese Unexamined Patent Application, Publication No. 2009-126948

SUMMARY OF THE INVENTION

However, in the case of performing a hydrophilic treatment of a base material including polyorganosiloxane on at least a part of a surface thereof by using the hydrophilic treatment agent disclosed in Patent Document 1, a high hydrophilic effect can be achieved immediately after the treatment, however the hydrophilic effect may be largely damaged after several hours to several days have passed.

The present invention has been made considering the above-mentioned problems, and has an object to provide a surface treatment liquid capable of making a base material including polyorganosiloxane on at least a part of a surface thereof hydrophilic, stably over a long period of time, and to provide a surface treatment method using the surface treatment liquid.

The inventors of the present invention have found that the above-mentioned problems can be solved when in a surface treatment liquid including (A) resin and a (B) solvent, resin having a functional group I that is a hydroxyl group and/or a cyano group, and a functional group II that is a hydrophilic group other than the functional group I is used as the (A) resin, and a ratio of a structural unit having an anionic group to the total structural units of the (A) resin is 5 mol % or less, or a resin having a cationic group including an anion moiety and a cation moiety bonded to the (A) resin is used, thereby arriving at completion of the present invention. More specifically, the present invention provides the followings.

A first aspect of the present invention is a surface treatment liquid used for making a base material including polyorganosiloxane on at least a part of a surface thereof hydrophilic, the surface treatment liquid including (A) resin and a (B) solvent, wherein a ratio of a structural unit having an anionic group to total structural units of the (A) resin is 5 mol % or less, and the (A) resin has a functional group I that is a hydroxyl group and/or a cyano group, and a functional group II that is a hydrophilic group other than the functional group I, wherein when the functional group II includes a hydroxyl group and/or a cyano group, the (A) resin may not have the functional group I.

A second aspect of the present invention is a surface treatment liquid including (A) resin and a (B) solvent, wherein a ratio of a structural unit having an anionic group to total structural units of the (A) resin is 5 mol % or less, the (A) resin has a functional group I that is a hydroxyl group and/or a cyano group, and a functional group II that is a hydrophilic group, wherein when the functional group II includes a hydroxyl group and/or a cyano group, the (A) resin may not include the functional group I, the (A) resin has a cationic group including an anion moiety, and a cation moiety that can be bonded to the (A) resin, and pH is 5 or more and 14 or less.

A third aspect of the present invention is a surface treatment method for making a base material including polyorganosiloxane on at least a part of the surface thereof in a treatment target hydrophilic, Wherein the method includes applying the surface treatment liquid according to the first aspect or the second aspect to at least a part of the surface of the base material.

The present invention can provide a surface treatment liquid capable of successfully making a base material including polyorganosiloxane on at least a part of the surface thereof hydrophilic stably over a long period of time, and provide a surface treatment method using the surface treatment liquid.

DETAILED DESCRIPTION OF THE INVENTION

<<First Surface Treatment Liquid>>

Hereinafter, a surface treatment liquid used for making a base material including polyorganosiloxane on at least a part of the surface thereof hydrophilic, the surface treatment liquid including (A) resin and a (B) solvent, wherein a ratio of a structural unit having an anionic group to total structural units of the (A) resin is 5 mol % or less, the (A) resin includes a functional group I that is a hydroxyl group and/or a cyano group, and a functional group II that is a hydrophilic group other than the functional group I, wherein when the functional group II includes a hydroxyl group and/or a cyano group, the (A) resin may not have the functional group I, is described as a "first surface treatment liquid."

Hereinafter, in the description of the first surface treatment liquid, when simply denoted by a "treatment liquid," it means the "first surface treatment liquid".

The first surface treatment liquid is used for making a base material including polyorganosiloxane on at least a part of the surface thereof hydrophilic as described above. When the surface of the base material includes polyorganosiloxane in at least a part thereof, even if surface treatment is carried out by using a conventionally known treatment liquid for making hydrophilic, it is difficult to achieve a long-term stable hydrophilic effect. It is considered difficult to maintain a high hydrophilic effect achieved immediately after the surface treatment over a long period of time because of reattachment of a hydrolytically condensable silane compound volatilized from polyorganosiloxane and its oligomer to a substrate surface.

On the contrary, in the case of using the treatment liquid that satisfies the above-described predetermined requirements, the base material including polyorganosiloxane on at least a part of the surface thereof can be made highly hydrophilic over a long period of time.

The polyorganosiloxane is not particularly limited. Specific examples of the polyorganosiloxane include polydimethylsiloxane, polymethylethylsiloxane, polymethylphenylsiloxane, polymethylpropylsiloxane, polydiphenylsiloxane, polymethylbutylsiloxane, and the like. Among them, polydimethylsiloxane is preferable because it is easily obtained, and it is particularly difficult to make hydrophilic stably over a long period of time when a conventional treatment liquid is used, and the like.

Hereinafter, components included in a first surface treatment liquid are described.

<(A) Resin>

(A) Resin has a functional group I that is a hydroxyl group and/or a cyano group. The (A) resin has also a functional group II that is a hydrophilic group other than the functional group I. Use of a treatment liquid including the (A) resin having a hydrophilic group allows for a hydrophilic treatment. The hydrophilic group is not particularly limited, and may be selected appropriately from functional groups which have been conventionally recognized as hydrophilic groups by a person skilled in the art.

Types of the (A) resin are not particularly limited as long as the (A) resin has a predetermined functional group, and is soluble to a (B) solvent. Examples of the (A) resin include (meth)acrylic resin, novolac resin, polyester resin, polyamide resin, polyimide resin, polyamide-imide resin, silicone resin, and the like. Among such resin, (meth)acrylic resin is preferable because of easiness in introduction of a functional group, and adjustment of the content ratio of units each having a functional group, and the like.

Specific examples of the hydrophilic group include a polyoxyalkylene group (for example, a polyoxyethylene group, a polyoxypropylene group, a polyoxyalkylene group in which an oxyethylene group and an oxypropylene group are block-bonded or randomly-bonded to each other, and the like), an amino group, a carboxy group, a hydroxyl group, a sulfonic acid group, and the like. Furthermore, an organic group including these groups is preferable as the hydrophilic group.

Furthermore, a cationic group including an anion moiety (counter anion) and a cation moiety that can be bonded to the (A) resin is also preferable as the hydrophilic group. Examples of the cation moiety constituting the cationic group include a nitrogen-containing cation moiety, a sulfur-containing cation moiety, an iodine-containing cation moiety, a phosphorus-containing cation moiety, and the like.

Anions constituting the anion moiety are not particularly limited. Valency of the anion is not particularly limited, and a monovalent anion or a divalent anion is preferable, and a monovalent anion is more preferable. Suitable examples of the monovalent anion as the anion moiety include a halide ion, a hydroxide ion, a nitrate ion, various types of organic acid ions derived from organic carboxylic acids or organic sulfone acid, and the like. Among them, a halide ion is preferable, a chloride ion, bromide ion, an iodide ion, and a fluoride ion are more preferable, a chloride ion and a bromide ion are further preferable, and a chloride ion is particularly preferable.

Preferable examples of the cationic group include groups including a quaternary ammonium salt group, groups including salts of nitrogen-containing aromatic heterocyclic group, groups including sulfonium salt groups, groups including iodonium salt groups, groups including phosphonium salt groups, and the like.

Among these cationic groups, the groups including quaternary ammonium salt group are preferable because they are easily introduced into the (A) resin, and have a high hydrophilic effect, and the like.

The quaternary ammonium salt group as the cationic group is preferably a group represented by the following formula (A-I):

(in the formula (A-I), $R^{1a}$, $R^{2a}$, and $R^{3a}$ are each independently an alkyl group having 1 or more and 4 or less carbon atoms, bonded to $N^+$, and two of $R^{1a}$, $R^{2a}$, and $R^{3a}$ may be bonded to each other to form a ring, and $R^{4a}$ is an alkylene group having 1 or more and 4 or less carbon atoms, and $X^-$ is a monovalent anion).

The alkyl group having 1 or more and 4 or less carbon atoms as $R^{1a}$, $R^{2a}$, and $R^{3a}$ may be linear or branched, and is preferably linear. Suitable specific examples of $R^{1a}$, $R^{2a}$, and $R^{3a}$ include a methyl group, an ethyl group, an n-propyl group, and an n-butyl group.

The alkylene group having 1 or more and 4 or less carbon atoms as $R^{4a}$ may be linear or branched, and is preferably linear. Suitable specific examples of $R^{4a}$ include a methylene group, an ethane-1,2-diyl group, a propane-1,3-diyl group, and a butane-1,4-diyl group.

Suitable examples of $X^-$ are the same as those of the suitable examples of the anions constituting the anion moiety described above.

Note here that the (A) resin includes anionic groups such as a carboxy group and a sulfonic acid group as the hydrophilic group, the ratio of a structural unit having an anionic group to total structural units of the (A) resin is 5 mol % or less.

When the (A) resin has a hydrophilic group including a hydroxyl group and/or a cyano group as the functional group II, the hydroxyl group and/or the cyano group included in the hydrophilic group also serves as the functional group I. Therefore, when the (A) resin has a hydrophilic group including the hydroxyl group and/or the cyano group as the functional group II, the (A) resin may not have the functional group I. Note here that the hydrophilic group including a hydroxyl group includes the hydroxyl group itself.

From the viewpoint that an excellent hydrophilic effect of the treatment liquid is achieved, the hydrophilic group is preferably a group represented by the following formula (A1):

(in the formula (A1), $R^1$ represents an alkyl group having 1 or more and 4 or less carbon atoms substituted with one or more groups selected from the group consisting of an amino group, a sulfonic acid group, and a hydroxyl group, a quaternary ammonium salt group represented by the formula (A-I) described above, or a hydrogen atom).

Specific examples of the hydrophilic group represented by formula (A1) include an amino group, and groups having $R^1$ represented by the following formulae, and the like.

[Chem. 1]
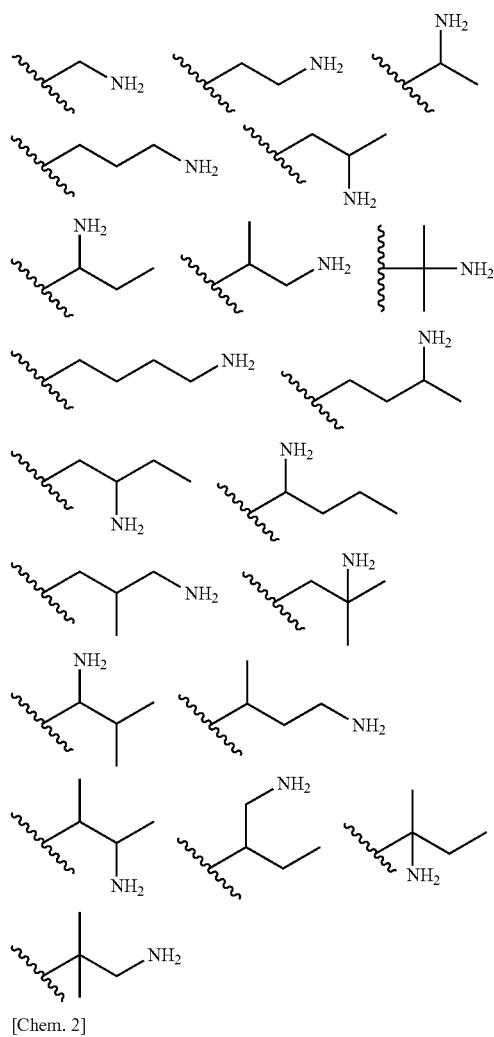
[Chem. 2]
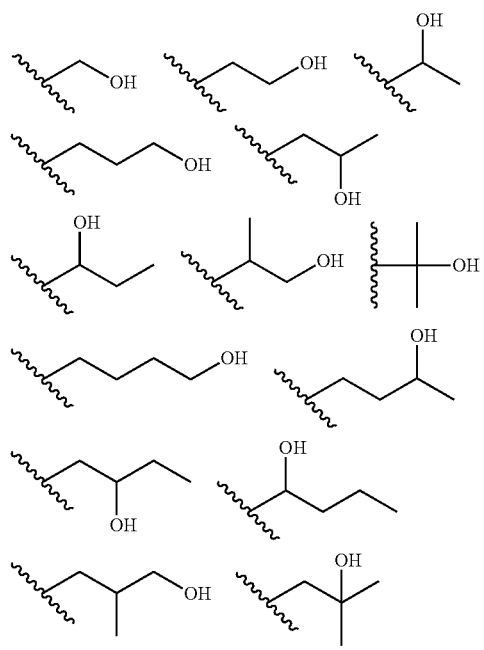
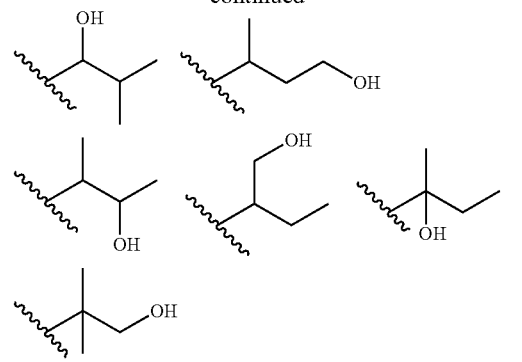
[Chem. 3]
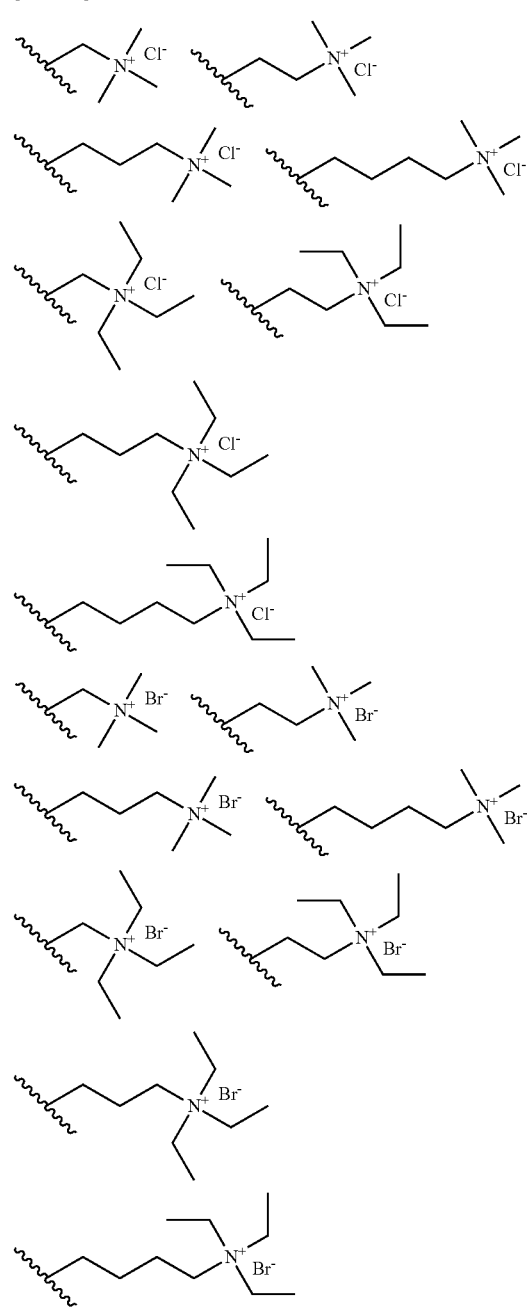

Among the hydrophilic groups represented by the above-mentioned formula (A1), the groups having $R^1$ represented by the following formulae are more preferable.
[Chem. 4]
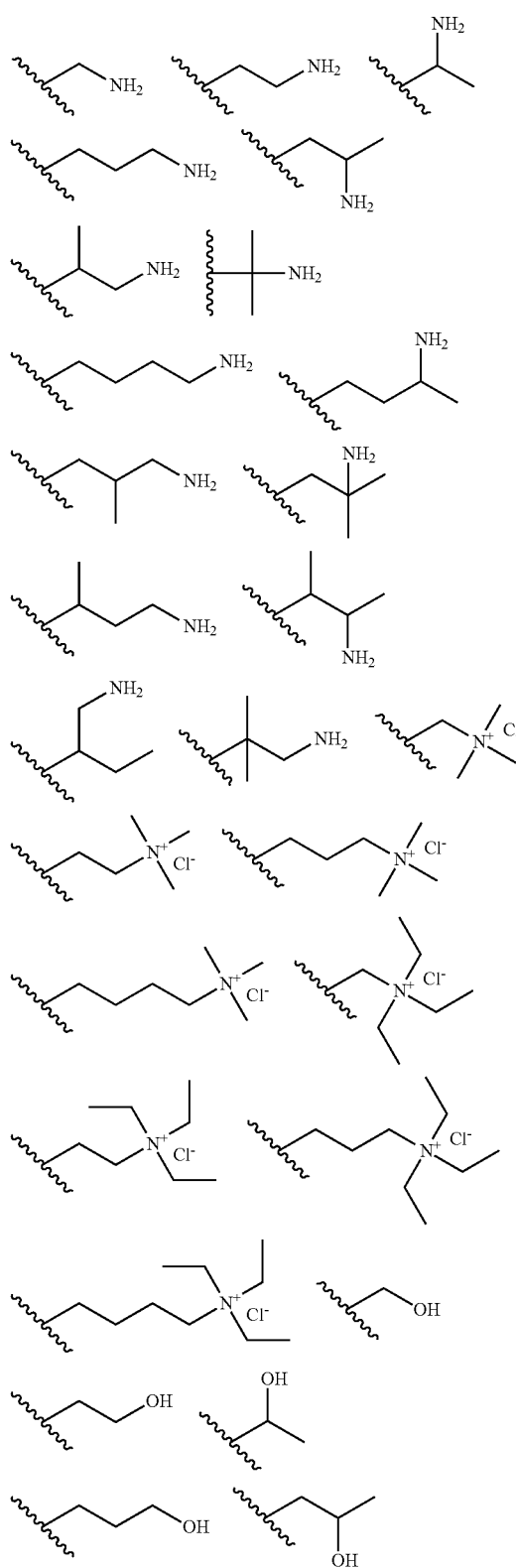
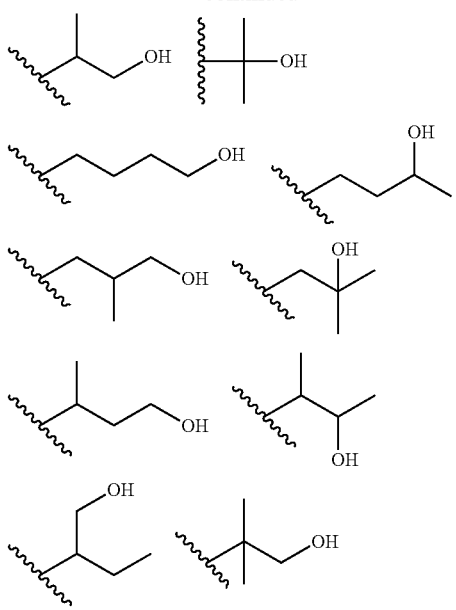
Among the hydrophilic groups represented by the above-mentioned formula (A1), the groups having $R^1$ represented by the following formulae are particularly preferable.
[Chem. 5]
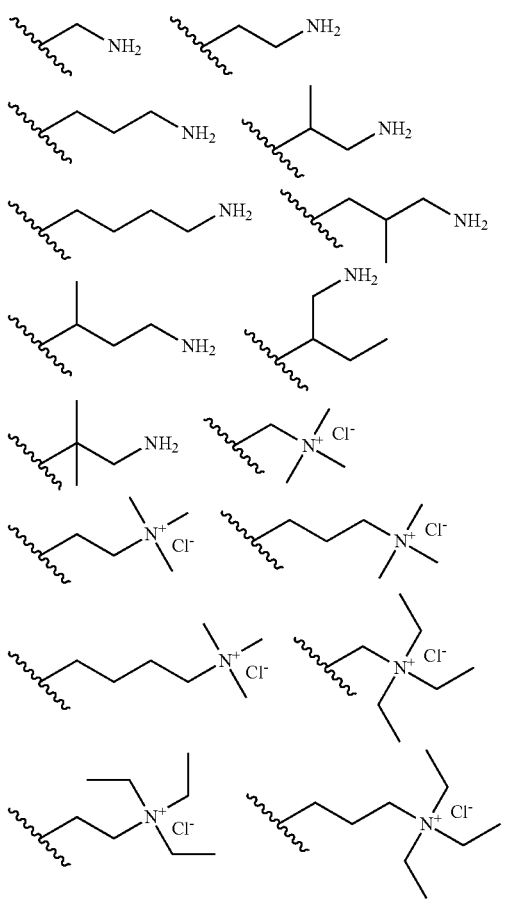

-continued

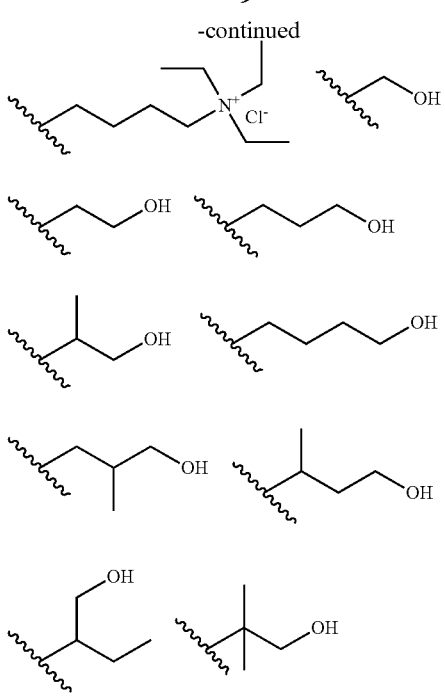

As the (A) resin, a polymer of a monomer having an unsaturated bond is preferable because various functional groups are easily introduced and the amount of the functional group is easily adjusted. Such a polymer may be a homopolymer or a copolymer.

In this case, the functional group I of the (A) resin is preferably a group derived from a monomer represented by the following formula (A2):

$$CH_2=CR^2-(R^3)_a-CO-R^4 \quad (A2)$$

(in the formula (A2), $R^2$ is a hydrogen atom or a methyl group, $R^3$ is a divalent hydrocarbon group, a is 0 or 1, $R^4$ is —OH, —O—$R^5$, or —NH—$R^5$, and $R^5$ is a hydrocarbon group substituted with a hydroxyl group and/or a cyano group).

In the above-mentioned formula (A2), $R^3$ is a divalent hydrocarbon group. The number of carbon atoms of the divalent hydrocarbon group is not particularly limited within a range in which the object of the present invention is not impaired. Because the (A) resin is easily obtained or prepared, the number of carbon atoms of the divalent hydrocarbon group as $R^3$ is preferably 1 or more and 20 or less, more preferably 1 or more and 12 or less, particularly preferably 1 or more and 10 or less, and the most preferably 1 or more and 6 or less.

The divalent hydrocarbon group as $R^3$ may be an aliphatic group, an aromatic group, and a hydrocarbon group including an aliphatic moiety and an aromatic moiety. When the divalent hydrocarbon group is an aliphatic group, the aliphatic group may be a saturated aliphatic group or an unsaturated aliphatic group. Furthermore, a structure of the aliphatic group may be a linear, branched, or cyclic, or a combination of these structures.

Specific examples of $R^3$ include a methylene group, an ethane-1,2-diyl group, an ethane-1,1-diyl group, a propane-1,3-diyl group, a propane-1,1-diyl group, a propane-2,2-diyl group, an n-butane-1,4-diyl group, an n-pentane-1,5-diyl group, an n-hexane-1,6-diyl group, an n-heptane-1,7-diyl group, an n-octane-1,8-diyl group, an n-nonane-1,9-diyl group, an n-decane-1,10-diyl group, an o-phenylene group, an m-phenylene group, a p-phenylene group, a naphthalene-2,6-diyl group, a naphthalene-2,7-diyl group, a naphthalene-1,4-diyl group, a biphenyl-4,4'-diyl group, and the like.

$R^4$ is —OH, —O—$R^5$, or —NH—$R^5$, and $R^5$ is a hydrocarbon group substituted with a hydroxyl group and/or a cyano group.

The hydrocarbon group constituting a main skeleton of the group of $R^5$ may be a linear, branched, or cyclic aliphatic group, or an aromatic hydrocarbon group.

The number of carbon atoms of the linear, branched, or cyclic aliphatic group is preferably 1 or more and 20 or less, and more preferably 1 or more and 12 or less.

Suitable examples of the linear or branched aliphatic group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a sec-pentyl group, a tert-pentyl group, an n-hexyl group, an n-heptyl group, an n-octyl group, an n-nonyl group, an n-decyl group, and the like. Suitable examples of the cyclic aliphatic group include cycloalkyl groups such as a cyclopropyl group, a cyclobutyl group, a cyclopentyl group, a cyclohexyl group, a cycloheptyl group, and a cyclooctyl group; groups in which one hydrogen atom is removed from polycycloalkanes such as adamantane, norbornane, isobornane, tricyclodecane, and tetracyclododecane, groups in which one hydrogen atom is removed from C1-C4 alkyl substitutes of the above-listed polycycloalkanes, or the like. Suitable examples of the aromatic hydrocarbon group include a phenyl group, a naphthyl group, an anthranil group, a phenanthrenyl group, a biphenylyl group, and the like. The aromatic hydrocarbon group may be substituted with a C1-C4 alkyl group such as a methyl group and an ethyl group.

Particularly preferable specific examples of the unit derived from a monomer represented by formula (A2) include the following units a2-1 to a2-8. Among the following units a2-1 to a2-8, units a2-1 to a2-3 are more preferable.

[Chem. 6]

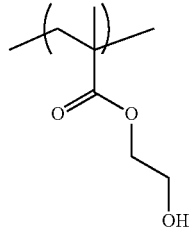

a2-1

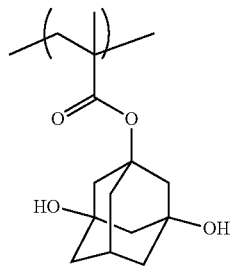

a2-2

Furthermore, the functional group II that is a hydrophilic group in the (A) resin is preferably derived from a monomer represented by the following formula (A3):

$$CH_2=CR^2-CO-NH-R^1 \quad (A3)$$

(in the formula (A3), $R^1$ is an alkyl group having 1 or more and 4 or less carbon atoms substituted with one or more groups selected from the group consisting of an amino group, a sulfonic acid group, and a hydroxyl group; a quaternary ammonium salt group represented by the above-described formula (A-I) or a hydrogen atom; and $R^2$ is a hydrogen atom or a methyl group).

In the formula (A3), $R^1$ is as described above. $R^1$ is preferably a quaternary ammonium salt group represented by the above-described formula (A-I).

In other words, it is preferable that the (A) resin includes, as a unit derived from a monomer represented by the above-mentioned formula (A3), a structural unit derived from the monomer represented by the following formula (A4):

$$CH_2=CR^2-CO-NH-R^{4a}-N^+R^{1a}R^{2a}R^{3a}.X^- \quad (A4)$$

(in the formula (A5), $R^2$ is a hydrogen atom or a methyl group, $R^{1a}$, $R^{2a}$, $R^{3a}$, $R^{4a}$, and $X^-$ are the same as those in the above-described formula (A-I)).

Particularly preferable specific examples of the unit having a hydrophilic group derived from a monomer represented by the formula (A3) include the following units a3-1 to a3-5.

[Chem. 7]

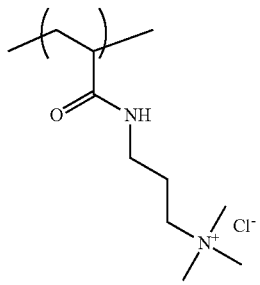

a3-5

When the (A) resin is a polymer of a monomer having an unsaturated bond, such a polymer may include constituent units other than the unit derived from the monomer represented by the formula (A2), and the unit derived from the monomer represented by the formula (A3) described above within a range in which the object of the present invention is not impaired.

Examples of the other constituent units include constituent units derived from monomers such as methyl(meth)acrylate, ethyl(meth)acrylate, isopropyl(meth)acrylate, n-propyl(meth)acrylate, n-butyl(meth)acrylate, isobutyl(meth)acrylate, tert-butyl(meth)acrylate, n-pentyl(meth)acrylate, isopentyl(meth)acrylate, phenyl(meth)acrylate, N-methyl(meth)acrylamide, N-ethyl(meth)acrylamide, N-n-propyl(meth)acrylamide, N-isopropyl(meth)acrylamide, N-n-butyl(meth)acrylamide, N-n-pentyl(meth)acrylamide, N-isopentyl(meth)acrylamide, N-phenyl(meth)acrylamide, N,N-dimethyl(meth)acrylamide, N,N-diethyl(meth)acrylamide, N,N-di-n-propyl(meth)acrylamide, N,N-di-n-butyl(meth)acrylamide, N,N-di-n-pentyl(meth)acrylamide, styrene, α-methyl styrene, β-methyl styrene, o-methyl styrene, m-methyl styrene, p-methyl styrene, and chlorostyrene.

When the (A) resin is a polymer of a monomer having an unsaturated bond, the ratio of constituent units derived from the monomer represented by the formula (A2) in the total constituent units included in such a polymer is preferably 0.1 mol % or more and 50 mol % or less, more preferably 1 mol % or more and 20 mol % or less, and particularly preferably 1 mol % or more and 15 mol % or less.

When the (A) resin is a polymer of a monomer having an unsaturated bond, the mole ratio of constituent units derived from the monomers represented by the formula (A3) to the total constituent units is preferably 50 mol % or more and 99.9 mol % or less, more preferably 60 mol % or more and 99 mol % or less, and particularly preferably 70 mol % or more and 99 mol % or less.

However, when the constituent units derived from the monomer represented by formula (A3) include a hydroxyl group and/or a cyano group, the ratio of constituent units derived from the monomer represented by formula (A3) to the total constituent units included in the polymer may be 100%.

The weight-average molecular weight of the (A) resin is preferably 100,000 or more. When the (A) resin having such a molecular weight is used, at the time of treatment with a treatment liquid, the (A) resin is easily bonded or attached to the surface of the treatment target by reaction or interaction between the functional group I and a surface of the treatment target.

Since an excellent surface treatment effect is achieved, the weight-average molecular weight of the (A) resin is preferably 200,000 or more, and more preferably 300,000 or more. The weight-average molecular weight of the (A) resin may be 1,000,000 or more as long as the (A) resin is soluble in a (B) solvent described later. The upper limit of the weight-average molecular weight of the (A) resin is not particularly limited as long as the (A) resin is soluble in the (B) solvent. The weight-average molecular weight of the (A) resin may be, for example, 2,500,000 or less, and may be 4,000,000 or less.

The amount of the (A) resin included in the treatment liquid is not particularly limited within a range in which the object of the present invention is not impaired, and the amount can be appropriately determined considering the application property of the treatment liquid. Typically, the amount of the (A) resin in the treatment liquid preferably has the following relationship between the (A) resin and the amount of a (B) solvent to be described later. When the mass of the (A) resin in the treatment liquid is 100 parts by mass, the amount of the (B) solvent to be described later is preferably 100 parts by mass or more and 10000 parts by mass or less, more preferably 500 parts by mass or more and 8000 parts by mass or less, and particularly preferably 1000 parts by mass or more and 6000 parts by mass or less.

<(B) Solvent>

A (B) solvent is not particularly limited as long as it can dissolve (A) resin. As long as a predetermined amount of the (A) resin is dissolved in the treatment liquid, the treatment liquid may include the (A) resin that is not dissolved and (B) solvent. It is preferable that the (A) resin is completely dissolved in the treatment liquid. When the treatment liquid includes insoluble matter, the insoluble matter may be attached to a surface of a treatment target at the time of surface treatment. In this case, the surface-treated surface of the treatment target is rinsed by a method to be described later, and thereby it is possible to remove the insoluble matter attached to the surface of the treatment target.

The (B) solvent may be water or an organic solvent or an aqueous solution of an organic solvent.

Specific examples of the organic solvent used as the (B) solvent include:

sulfoxides such as dimethylsulfoxide;

sulfones such as dimethylsulfone, diethylsulfone, bis(2-hydroxyethyl)sulfone, and tetramethylene sulfone;

amides such as N,N-dimethylformamide, N-methylformamide, N,N-dimethylacetamide, N-methylacetamide, and N,N-dimethylacetamide;

lactams such as N-methyl-2-pyrrolidone, N-ethyl-2-pyrrolidone, N-propyl-2-pyrrolidone, N-hydroxymethyl-2-pyrrolidone, and N-hydroxyethyl-2-pyrrolidone;

imidazolidinones such as 1,3-dimethyl-2-imidazolidinone, 1,3-diethyl-2-imidazolidinone, and 1,3-diisopropyl-2-imidazolidinone;

dialkyl glycol ethers such as dimethyl glycol, dimethyl diglycol, dimethyl trigylcol, methylethyl diglycol, diethyl glycol, and triethylene glycol butyl methyl ether; (poly)alkylene glycol monoalkyl ethers such as ethylene glycol monomethyl ether, ethylene glycol monoethyl ether, ethylene glycol mono-n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, tripropylene glycol monomethyl ether, and tripropylene glycol monoethyl ether;

(poly)alkylene glycol monoalkyl ether acetates such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate, and propylene glycol monoethyl ether acetate;

other ethers such as dimethyl ether, diethyl ether, methylethyl ether, dipropyl ether, diisopropyl ether, dibutyl ether, diisoamyl ether, diethylene glycol dimethyl ether, diethylene glycol methylethyl ether, diethylene glycol diethyl ether, and tetrahydrofuran;

ketones such as methyl ethyl ketone, cyclohexanone, 2-heptanone, and 3-heptanone;

alkyl lactate esters such as methyl 2-hydroxypropionate, and ethyl 2-hydroxypropionate; other esters such as 2-hydroxy-2-methylpropionic acid ethyl, 3-methoxypropionic acid methyl, 3-methoxypropionic acid ethyl, 3-ethoxypropionic acid methyl, 3-ethoxypropionic acid ethyl, ethoxy acetic acid ethyl, hydroxyl acetic acid ethyl, 2-hydroxy-3-methylbutanoic acid methyl, 3-methyl-3-methoxybutyl acetate, 3-methyl-3-methoxybutyl propionate, ethyl acetate, n-propyl acetate, i-propyl acetate, n-butyl acetate, i-butyl acetate, n-pentyl formate, i-pentyl acetate, n-butyl propionate, ethyl butyrate, n-propyl butyrate, i-propyl butyrate, n-butyl butyrate, methyl pyruvate, ethyl pyruvate, n-propyl pyruvate, methyl acetoacetate, ethyl acetoacetate, and ethyl 2-oxobutanoate;

lactones such as β-propiolactone, γ-butyrolactone, and δ-pentyrolactone;

linear, branched, or cyclic aliphatic hydrocarbons such as n-hexane, n-heptane, n-octane, n-nonane, methyloctane, n-decane, n-undecane, n-dodecane, 2,2,4,6,6-pentamethyl heptane, 2,2,4,4,6,8,8-heptamethyl nonane, cyclohexane, and methyl cyclohexane;

aromatic hydrocarbons such as benzene, toluene, xylene, 1,3,5-trimethyl benzene, and naphthalene;

terpenes such as p-menthane, diphenyl menthane, limonene, terpinene, bornane, norbornane and pinane; and the like.

When the (B) solvent is a mixed solvent of water and an organic solvent, the content of the organic solvent in the (B) solvent is preferably 10 mass % or more, and more preferably 20 mass % or more.

<Other Components>

The treatment liquid may include various components other than the (A) resin, and a (B) solvent mentioned above, within a range in which the object of the present invention is not impaired. Examples of the other components include a pH adjustment agent, a coloring agent, a surface-active agent, a defoaming agent, a viscosity modifier, and the like.

The pH adjustment agent is not particularly limited, and various acids or bases can be used. Since a preferable hydrophilic effect is achieved, pH of the treatment liquid is adjusted to preferably 5 or more and 14 or less, more preferably 5 or more and 12 or less, and particularly preferably 5 or more and 10 or less.

<Preparation Method of Treatment Liquid>

A method for preparing a treatment liquid is not particularly limited. The treatment liquid can be typically prepared by homogeneously mixing predetermined amounts of the (A) resin, and a (B) solvent, and the other components if necessary.

The above-described treatment liquid is suitably used for, for example, surface treatment of a cell culture instrument, a biochip, a contact lens, a medical instrument, a micro channel device for circulating a liquid including biological samples such as cells, and the like, and surface treatment for the purpose of providing various articles with an antifouling property, an antifog property, and the like.

<<Second Surface Treatment Liquid>>

Hereinafter, a surface treatment liquid including (A) resin and a (B) solvent, wherein a ratio of a structural unit having an anionic group to total structural units of the (A) resin is 5 mol % or less, the (A) resin includes a functional group I that is a hydroxyl group and/or a cyano group, and a functional group II that is a hydrophilic group, wherein when the functional group II includes a hydroxyl group and/or a cyano group, the (A) resin may not have a functional group I;

the (A) resin has a cationic group including an anion moiety, and a cation moiety bonded to the (A) resin; and pH is 5 or more and 14 or less, is described as a "second surface treatment liquid."

The second surface treatment liquid is the same as the first surface treatment liquid except that it is essential that pH is 5 or more and 14 or less, and purpose of use thereof is not limited to making a base material including polyorganosiloxane on at least a part of the surface thereof hydrophilic.

An adjusting method and a preferable range of pH are the same as described for the first surface treatment liquid.

The second surface treatment liquid is suitably used for making various base materials hydrophilic, but similar to the first surface treatment liquid, the second surface treatment liquid is particularly preferably used for making a base material including polyorganosiloxane on at least a part of the surface thereof hydrophilic.

<<Surface Treatment Method>>

Surface treatment using the above-described surface treatment liquid (the first surface treatment liquid or the second surface treatment liquid) is preferably hydrophilic treatment of a base material including polyorganosiloxane on at least a part of the surface thereof as described above. The polyorganosiloxane is as described for the first surface treatment method.

The surface treatment method usually includes applying a surface treatment liquid to a surface of a base material as a treatment target. The applying method of the surface treatment liquid is not particularly limited. Specific examples of the applying method include a spin coating method, a spray method, a roller coating method, a dipping method, and the like. When the treatment target is a substrate, since uniform application of the surface treatment liquid allows a surface of the base material to be uniformly hydrophilic, a spin coating method is preferable as an applying method.

When a surface of a base material as a treatment target to which a surface treatment liquid is applied includes a material other than polyorganosiloxane, the material other than polyorganosiloxane is not particularly limited, and may be an organic material or an inorganic material. Examples of the organic material include various resin materials including polyester resin such as PET resin and PBT resin; various nylon; polyimide resin; polyamide-imide resin; polyolefin such as polyethylene and polypropylene; polystyrene; (meth)acrylic resin; and the like. Furthermore, photosensitive resin components included in various resist material, and alkali soluble resin components are also preferable as the organic material. Examples of the inorganic material include glass, silicon, and various metal such as copper, aluminum, iron, and tungsten. The metal may be an alloy.

When the material of a surface to which a surface treatment liquid is applied includes an organic material, it is preferable to use a surface treatment liquid including (A) resin having a hydroxyl group as the functional group I.

When the material for a surface to which a surface treatment liquid is applied includes an inorganic material, it is preferable to use a surface treatment liquid including (A) resin having a hydroxyl group and/or a cyano group as the functional group I.

Shapes of a basic material as a treatment target are not particularly limited. The base material may be a flat substrate, and may have a three-dimensional shape such as a spherical shape and a columnar shape. Furthermore, the surface of the treatment target may be flat, or may have regular or irregular concavity and convexity.

After the surface treatment liquid is applied to a surface of the treatment target, a coated film may be heated to remove at least a part of the (B) solvent, if necessary.

A part of the treatment target to which the surface treatment liquid is applied is preferably rinsed. In particular, when the surface treatment liquid including (A) resin having a weight-average molecular weight of 100,000 or more and having a predetermined functional group is applied to the surface of the treatment target, the (A) resin is easily successfully attached or bonded to the surface of the treatment target. However, a certain amount of the (A) resin that has not been attached or bonded to the surface of the treatment target is present on the surface of the treatment target. Therefore, in order to reduce the influence of the (A) resin on the surface property of the treatment target to a maximum extent, it is preferable that the (A) resin which has not been attached or bonded to the surface is washed out by rinsing.

When the surface treatment liquid includes water as the (B) solvent, rinsing with water is preferable. Furthermore, when the surface treatment liquid includes an organic solvent as the (B) solvent, rinsing with an organic solvent is also preferable. When rinsing with an organic solvent, it is preferable to use an organic solvent of the same type as the organic solvent included in the surface treatment liquid.

After the surface treatment liquid is applied or rinsed, the surface of the treatment target is dried, thereby obtaining an article, which has been successfully made hydrophilic.

EXAMPLES

Hereinafter, the present invention will be explained more specifically by way of Examples, but the present invention is not limited to the following Examples.

Example 1, Example 2, Comparative Example 1

In Example 1, the following Resin 1 was used; in Example 2, the following Resin 2 was used; in Comparative Example 1, the following Resin 3 was used. In the following formulae, each number at the right lower of parenthesis denotes mol % of each structural unit in the total structural units in the resin.

[Chem. 8]

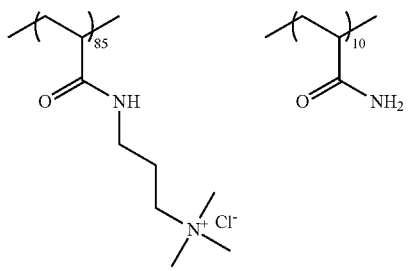

Resin 1

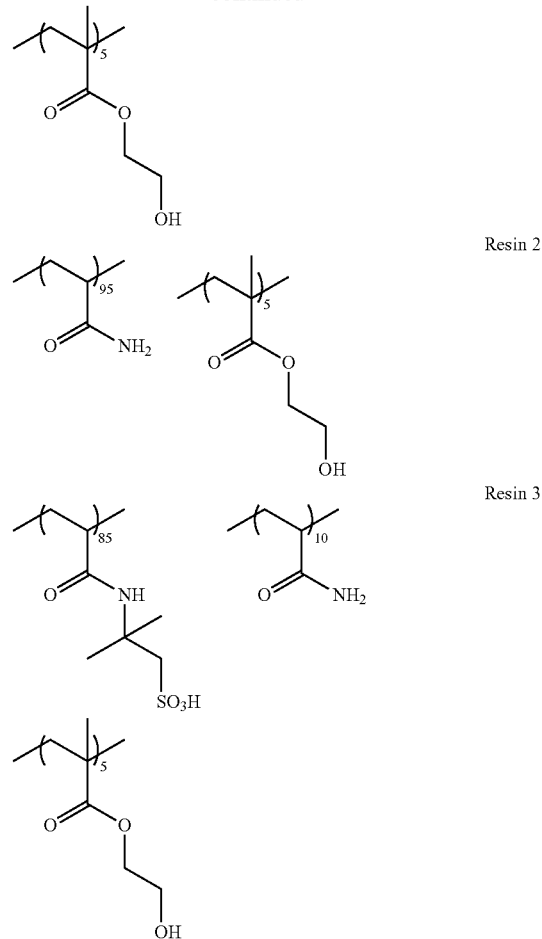

The above-described resin was dissolved in water such that the solid content concentration became 1 mass % to obtain surface treatment liquids of Examples 1 and 2 and Comparative Example 1. Note here that pH of the surface treatment liquid obtained in Example 1 was 6, pH of the surface treatment liquid obtained in Example 2 was 7, and pH of the surface treatment liquid obtained in Comparative Example 1 was 2.

Evaluation of Surface Treatment Effect

Surface treatment of a treatment target was carried out with the following method by using the surface treatment liquids of Examples 1 and 2 and Comparative Example 1, which were obtained with the above-described method. As the treatment target, a substrate made of polydimethylsiloxane was used.

Firstly, the treatment target was dip-coated with a treatment liquid, and then, the treatment target was dried in an oven for five minutes. After drying, a surface of the treatment target was washed with pure water, and then air-dried to obtain a surface-treated treatment target.

The water contact angle of the surface of the treatment target was measured immediately after air drying, and one hour, three hours, and twelve hours after the air drying, and change of the hydrophilic effect over time was evaluated. The water contact angle was measured using Dropmaster 700 (manufactured by Kyowa Interface Science Co., Ltd.) as follows: a pure water droplet (2.0 μL) was dropped onto a surface-treated surface of a substrate, and the contact angle was measured after 10 seconds of dropping.

As a result of the evaluation, the substrate that had been treated with the surface treatment liquid of Example 1 had a water contact angle of less than 10° and stable in any measurement times. Furthermore, the substrate that had been treated with the surface treatment liquid of Example 2 had a water contact angle of little less than 20° immediately after air drying, while the angle was increased to little less than 40° three hours after the drying, but the angle did not exceed 40° even twelve hours after the drying.

On the other hand, the substrate treated with the surface treatment liquid of Comparative Example 1 had a water contact angle of little less than 60° immediately after air drying, while the angle was increased up to little over 80° after one hour, and the angle was increased to about 110° after three hours and twelve hours, showing that the hydrophilic effect was lost.

What is claimed is:

1. A surface treatment method for making a base material comprising polyorganosiloxane in at least a part of a surface of a treatment target hydrophilic, the method comprising:
   applying a surface treatment liquid comprising a (A) resin and a (B) solvent to the at least a part of a surface of the base material,
      wherein a ratio of a structural unit having an anionic group to total structural units of the (A) resin is 5 mol % or less,
      the (A) resin comprises a functional group I that is a hydroxyl group and/or a cyano group, and optionally a functional group II that is a hydrophilic group other than the functional group I,
      the (A) resin contains a structural unit comprising a cationic group, and
      pH of the surface treatment liquid is 5 to 14.

2. The surface treatment method according to claim 1, wherein
   the (A) resin has a structural unit derived from a monomer represented by the following formula (A4):

$$CH_2=CR^2-CO-NH-R^{4a}-N^+R^{1a}R^{2a}R^{3a}.X^- \qquad (A4)$$

wherein $R^2$ is a hydrogen atom or a methyl group; $R^{1a}$, $R^{2a}$, and $R^{3a}$ are each independently an alkyl group having from 1 to 4 carbon atoms, and bonded to $N^+$; and two of $R^{1a}$, $R^{2a}$, and $R^{3a}$ may be bonded to each other to form a ring; $R^{4a}$ is an alkylene group having from 1 to 4 carbon atoms; and $X^-$ is a monovalent anion, and
a ratio of the structural unit derived from the monomer represented by the formula (A4) to total structural units of the (A) resin is 50 mol % to 85 mol %.

3. The surface treatment method according to claim 1, wherein the polyorganosiloxane is polydimethylsiloxane.

4. The surface treatment method according to claim 1, wherein the treatment target is a biochip, a micro channel device, a contact lens, or a medical instrument.

5. A surface treatment method for making a base material comprising polyorganosiloxane in at least a part of a surface of a treatment target hydrophilic, the method comprising:
   applying a surface treatment liquid comprising a (A) resin and a (B) solvent to the at least a part of a surface of the base material,
      wherein a ratio of a structural unit having an anionic group to total structural units of the (A) resin is 5 mol % or less,
      the (A) resin comprises a functional group I that is a hydroxyl group and/or a cyano group, and optionally a functional group II that is a hydrophilic group other than the functional group I,
      the (A) resin has a structural unit derived from a monomer represented by the following formula (A4):

$$CH_2=CR^2-CO-NH-R^{4a}-N^+R^{1a}R^{2a}R^{3a}.X^- \qquad (A4)$$

wherein $R^2$ is a hydrogen atom or a methyl group; $R^{1a}$, $R^{2a}$, and $R^{3a}$ are each independently an alkyl group having from 1 to 4 carbon atoms, and bonded to $N^+$; and two of $R^{1a}$, $R^{2a}$, and $R^{3a}$ may be bonded to each other to form a ring; $R^{4a}$ is an alkylene group having from 1 to 4 carbon atoms; and $X^-$ is a monovalent anion, and
a ratio of the structural unit derived from the monomer represented by the formula (A4) to total structural units of the (A) resin is 50 mol % to 85 mol %.

6. The surface treatment method according to claim 5, wherein the polyorganosiloxane is polydimethylsiloxane.

7. The surface treatment method according to claim 5, wherein the treatment target is a biochip, a micro channel device, a contact lens, or a medical instrument.

* * * * *